INVENTOR
William B. McLean

BY *Walter G. Finch*
ATTORNEY

Oct. 13, 1964
W. B. McLEAN
3,152,777
JET PROPELLED AEROSTAT
Filed Nov. 16, 1962
3 Sheets-Sheet 2
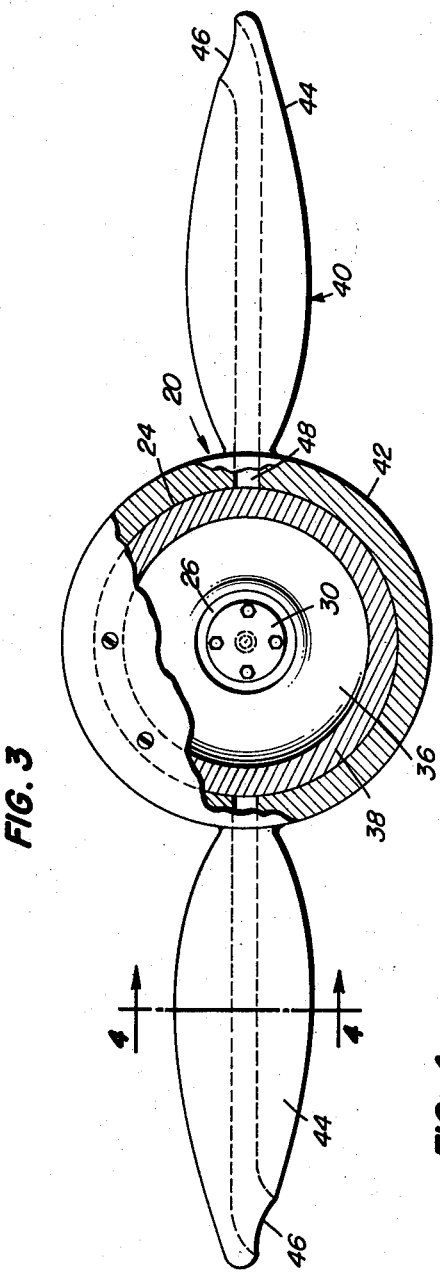
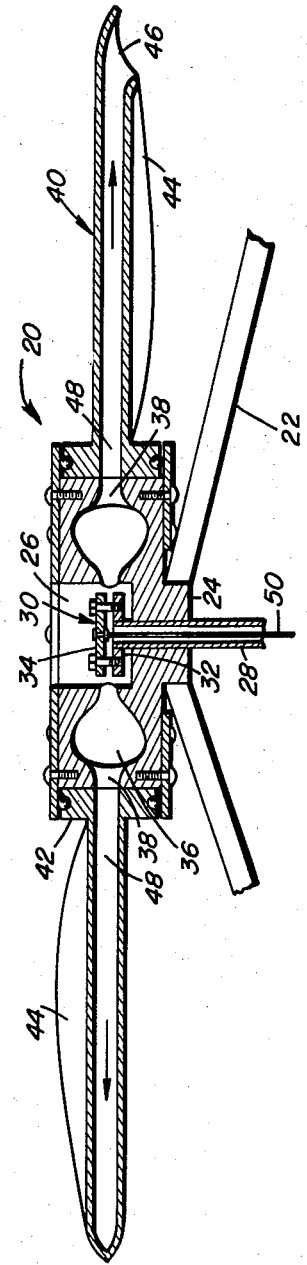
INVENTOR
William B. McLean
BY Walter G. Finch
ATTORNEY Oct. 13, 1964

W. B. McLEAN 3,152,777

JET PROPELLED AEROSTAT

Filed Nov. 16, 1962

INVENTOR
William B. McLean

BY Walter G. Finch
ATTORNEY

United States Patent Office 3,152,777
Patented Oct. 13, 1964

3,152,777
JET PROPELLED AEROSTAT
William B. McLean, 510 Lexington St., China Lake, Calif., assignor of fifty percent to Walter G. Finch, Baltimore, Md.
Filed Nov. 16, 1962, Ser. No. 238,082
15 Claims. (Cl. 244—30)

This invention relates generally to aircraft, and more particularly it pertains to a hot air aerostat.

Balloons using hot air for buoyancy have been made for the past several hundred years. Various types of combustion processes have been utilized to provide the heated air. With the advent of many plastic materials, such as aluminized synthetics, Mylar for example, and modern light weight fuels of the propane or butane types, a revival of interest in these aircraft is imminent.

It is an object of the present invention to provide a method and means for inflating an aerostat envelope and at the same time providing heat necessary to cause buoyancy.

Another object of this invention is to provide a self-driven hot air generator inflater for static aircraft which provides propulsive power for driving and maneuvering thereof.

Still another object of this invention is to provide steering means for a force fed hot air aerostat.

To provide variable feed orifice for a toroidal type combustion chamber is still another object of the invention.

These and other objects and attendant advantages of this invention will become more readily understood and apparent from the accompanying specification and drawings in which:

FIG. 3 is an enlarged plan view, with portions cut away, of a hot air generator embodying features of this invention;

FIG. 4 is a section taken on line 4—4 of FIG. 3;

FIG. 5 is a vertical section of the generator shown in FIG. 3;

Figure 1:
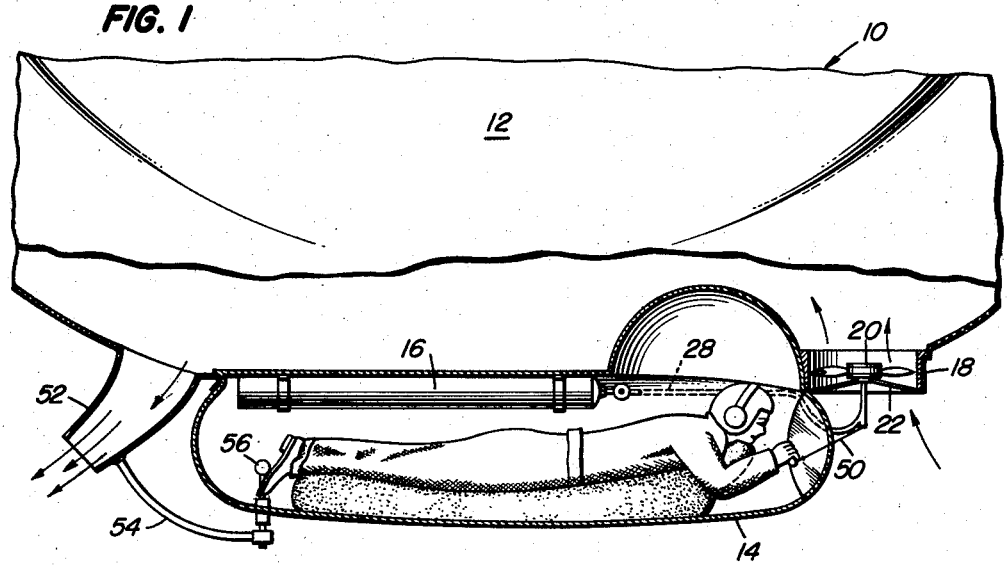
FIG. 1 is a side elevation partly broken away of a novel jet propelled aerostat incorporating features of this invention.
Figure 2:
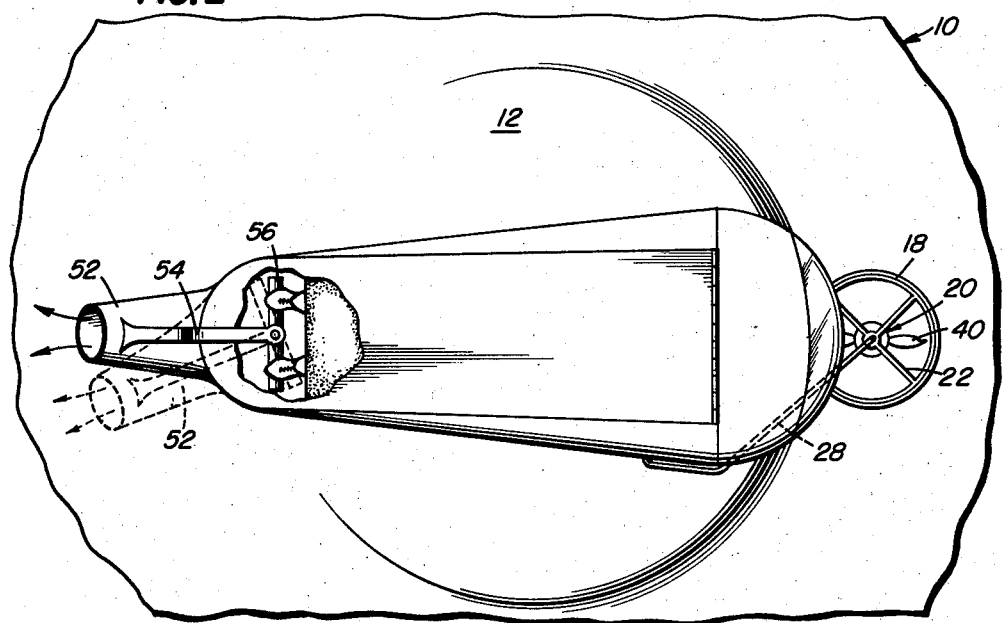
FIG. 2 is a bottom view of the aerostat depicted in FIG. 1 with a portion broken away for clarity of details.
Figure 6:
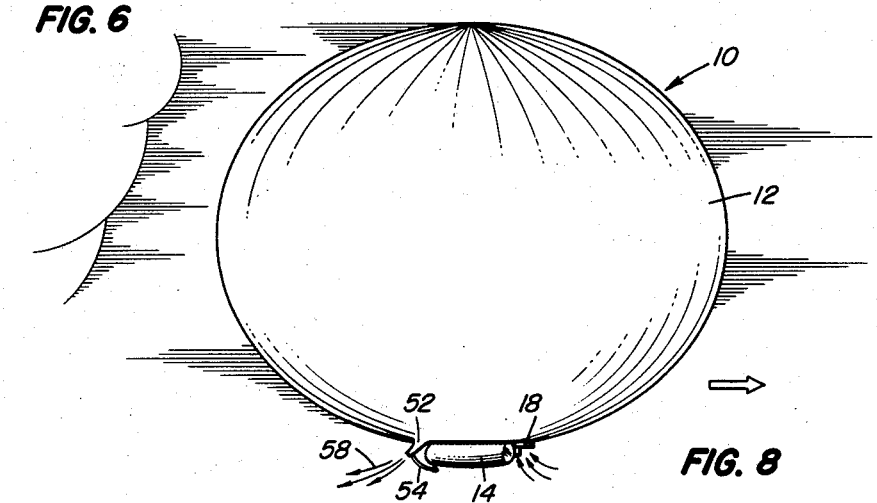
FIG. 6 is a perspective view of the aerostat showing the location of the hot air generator and other components of the invention.

Referring now to the details of the drawings in FIGS. 1, 2 and 6 there is shown depicted an aerostat 10 which comprise an inflatable spherical or elongated shaped envelope if desired. Suitably supported on a suspension band (not shown) from the envelope 12, is a suspension basket 14 for housing the aeronaut, controls and a fuel tank 16, the latter preferably containing a compressed combustion fuel such as propane.

The underside of the envelope 12 is provided with a cylindrical air duct 18 which is open to the atmosphere. A hot air generator 20 is centrally supported within this duct 18 upon a spider strut 22.

As best shown in FIGS. 3 and 5, this generator 20 consists of a fixed circular block 24 having a cylindrical central cavity 26 therein open to the atmosphere on one end either at the top as shown, or at the bottom.

A fuel line 28, as shown in FIGS. 2 and 5, extends from the fuel tank 16 and axially enters the block 24 terminating in a controllable annular orifice 30. This orifice 30 consists of a flange 32 on the end of the fuel line 28 and movably supported thereover an adjustment disk 34. The gap between the disks 32 and 34 is utilized to guide the flow of the propane gas radially outward at the same time entrapping atmosphere air from the cavity 26 as it flows into a torus or toroidal shaped combustion chamber 36 arranged thereabout in the block 24. A ring passage 38 or an equivalent series of holes or slots leads radially outward from the torus chamber 36 to the outer periphery of the block 24.

The hub 42 of a propeller 40 is mounted for rotation about the block 24. This propeller 40 is provided with one or more inclined hollow blades 44 having a tip orifice 46 communicating with the interior and directed toward the following edge. Also communicating with the interior of the block 44 is a hole passage 48 in the hub 42.

The mixture of combustible gas and air is ignited in the torus chamber 36 and the products of combustion rush out through the ring passage 38, and, by means of the hole passages 48 of the hub 42, into the blades 44. Further combustion occurs therein of the unburned fuel to heat the blades and the residue emerges at high velocity from the tip orifices 46.

The reaction of the emerging gases causes the propeller 40 to rotate, thus pumping and heating outside air through the previously mentioned duct 18 into the envelope 12 to inflate it for flight.

The fuel mixture and thus the heat and speed of the generator 20 can be controlled by means of a control wire or rod 50 available to the aeronaut and which adjusts the gap between the disk 34 and flange 32 of the orifice 30.

An air exit in the form of a flexible appendix or passage 52 is made low down on one side of the envelope 12 and provides for the removal of the cooled gases therein. It is made of such diameter as to provide super pressure within the envelope 12 so as to maintain inflation thereof.

A tiller 54 attached to this appendix 52 is pivoted on a rudder bar 56 to direct the emerging jet 58 of spent hot air and gas to either side of the envelope 12, which thus propels and steers the aerostat 10 in the direction of the large arrow as shown in FIG. 6.

The location and attitude of the air duct 18 may be otherwise than as shown in FIG. 6. For example, it may be located at the dynamic center of the aerostat 10 as depicted in FIGS. 7 and 8 or otherwise placed for best stability considering the use of the aerostat.

It may be inclined in a forwardly opening attitude so as to draw air from the direction of travel so as to aid in the speed of propulsion.

Figure 8:
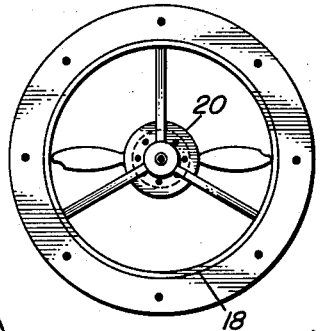
FIG. 8 is a fragmentary view taken on the line 8—8 of FIG. 7.
Figure 7:
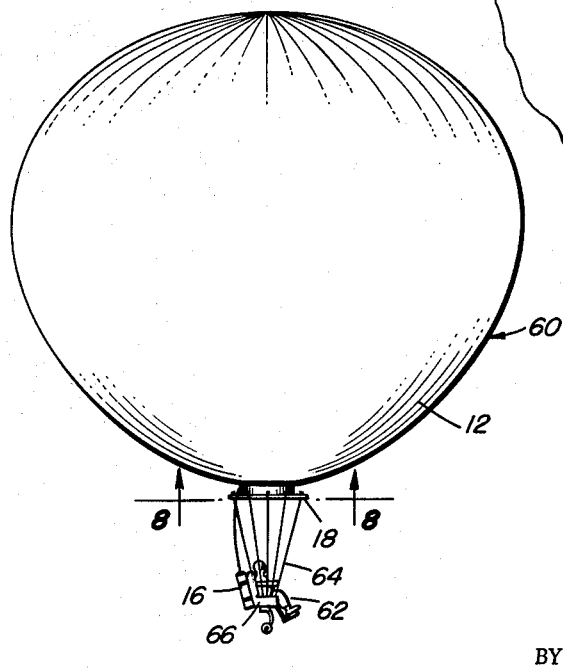
FIG. 7 depicts an alternate embodiment of the invention.

This embodiment of aerostat 60 as shown in FIGS. 7 and 8 locates the air duct 18 with its hot air generator 20 directly above the load, in this case an aeronaut 62. The suspension lines 64 for the chair 66 are attached directly to the air duct 18 which acts as a suspension band.

Spent hot air exit ports, not shown, may be located circumferentially around the envelope 12 opening in a downward direction so as to provide a jet action lifting force supplementing that from the heated air within.

This aerostat 60 is useful for lifting and short haul of weights or for elevated observation posts for observers. Sports enthusiasts would also find this aerostat 60 desirable in the nature of a "free" balloon much more efficient and controllable than heretofore available.

Obviously many modifications and variations of the present invention are possible in light of the above teachings. It is, therefore, to be understood that within the scope of the appended claims the invention may be practiced otherwise than as specifically described.

What is claimed is:

1. A lighter than air aircraft, comprising, an inflatable envelope having at least one inlet opening and at least one outlet opening, and means for injecting a sufficient quantity of buoyant gas through the inlet opening of said inflatable envelope to effect and maintain inflation thereof, whereby said inflatable envelope becomes air-borne and subsequently propelled by discharge of said buoyant gas through said outlet opening.

2. A lighter than air aircraft, comprising, an inflatable envelope having at least one inlet opening and at least one outlet opening and means including a hot air generator injecting its exhaust gas and air heated thereby through the inlet opening of said inflatable envelope to effect and maintain inflation thereof, whereby said inflatable envelope becomes air-borne and subsequently propelled by discharge of said buoyant gas through said outlet opening.

3. A lighter than air aircraft, comprising, an inflatable envelope having at least one inlet opening and at least one outlet opening, means including a rotating impeller element positioned to inject a gas through said inlet opening into said envelope and means for heating said rotating impeller element, whereby air that is drawn therethrough is heated to buoy said envelope and to permit propulsion thereof by discharge of the heated air through the outlet opening in said envelope.

4. A lighter than air aircraft, comprising, an inflatable envelope having at least one inlet opening and at least one outlet opening, means including an impeller element positioned to inject a gas through said inlet opening into said envelope, and means for simultaneously heating and rotating said impeller element, whereby air is drawn therethrough and supplied in a buoyant condition to said envelope to cause inflation thereof and subsequent propulsion by discharge of the air through the outlet opening of said envelope.

5. The lighter than air aircraft of claim 4, wherein said inflatable envelope has one inlet opening.

6. A lighter than air aircraft, comprising, an inflatable envelope having at least one inlet opening and at least one outlet opening, means including an impeller positioned to inject a gas through said inlet opening into said envelope, and means including a combustion chamber having its exhaust arranged to heat and rotate said impeller element, whereby air is drawn therethrough and heated to buoy said envelope and to permit propulsion thereof by discharge of the heated air through the outlet opening in said envelope.

7. The lighter than air aircraft of claim 6, wherein the outlet opening in said envelope is an elongated annular structure extending therefrom, with additional means being provided to control the orientation of said annular structure to thereby control the direction of movement of said aircraft.

8. The lighter than air aircraft of claim 6, wherein a platform is positioned beneath and attached to said inflatable envelope.

9. The lighter than air aircraft of claim 8, wherein said inlet and outlet openings in said envelope are located substantially at opposite ends of said platform.

10. The lighter than air aircraft of claim 6, wherein said impeller element has internal passages in communication with said combustion chamber and terminating at the following edge of said impeller element.

11. A lighter than air aircraft, comprising, an inflatable envelope having an inlet opening defined by an annular sleeve and having an outlet opening, means including a hub mounted transverse to the axis of said annular sleeve, said hub having a cavity in at least one side thereof, an impeller element rotatably mounted on said hub, a combustible gas supply having an outlet within said cavity, at least one combustion chamber located within said hub adjacent said cavity and having an inner opening into said cavity and an outer opening arranged to communicate with said impeller element, whereby combustion products from said combustion chamber contact said impeller element to heat air drawn therethrough into said inflatable envelope.

12. A lighter than air aircraft, comprising, an inflatable envelope having an inlet opening defined by an annular sleeve and having an outlet opening, means including a hub mounted transverse to the axis of said annular sleeve and having a cavity in one side thereof, an impeller element rotatably mounted on said hub and having internal passages terminating at the following edge of said impeller element, a combustible gas supply including a supply line terminating in an orifice within said cavity, a plurality of combustion chambers located within said hub and adjacent said cavity and having inner openings in register with the orifice of said supply line and outer openings in communication with the internal passages of said impeller element, whereby said impeller element is simultaneously heated and rotated to inflate with heated air said inflatable envelope, and means including a platform attached to the underside of said inflatable envelope.

13. The lighter than air aircraft of claim 12 and in addition adjustable means are provided to control the size of the orifice of said supply line.

14. The lighter than air aircraft of claim 12, wherein said combustion chambers are toroidal shaped.

15. The lighter than air aircraft of claim 12, wherein the outlet opening in said inflatable envelope is an elongated structure extending therefrom, with additional means are provided to control the orientation of said outlet opening to thereby control the direction of movement of said aircraft.

References Cited in the file of this patent

UNITED STATES PATENTS

| | | |
|---|---|---|
| 2,475,786 | Jordan | July 12, 1949 |
| 2,651,376 | Stanitz | Sept. 8, 1953 |
| 2,831,543 | Matthews | Apr. 22, 1958 |
| 3,053,324 | Morley | Sept. 11, 1962 |

OTHER REFERENCES

Flight, "Modern Montgolfier," Capt. L. Arther, Nov. 2, 1951, vol LX, Issue 2232, p. 560.